A. P. ANDERSON.
APPARATUS FOR THE TREATMENT OF STARCH MATERIALS.
APPLICATION FILED OCT. 14, 1907.
1,035,842.
Patented Aug. 20, 1912.
5 SHEETS—SHEET 3.
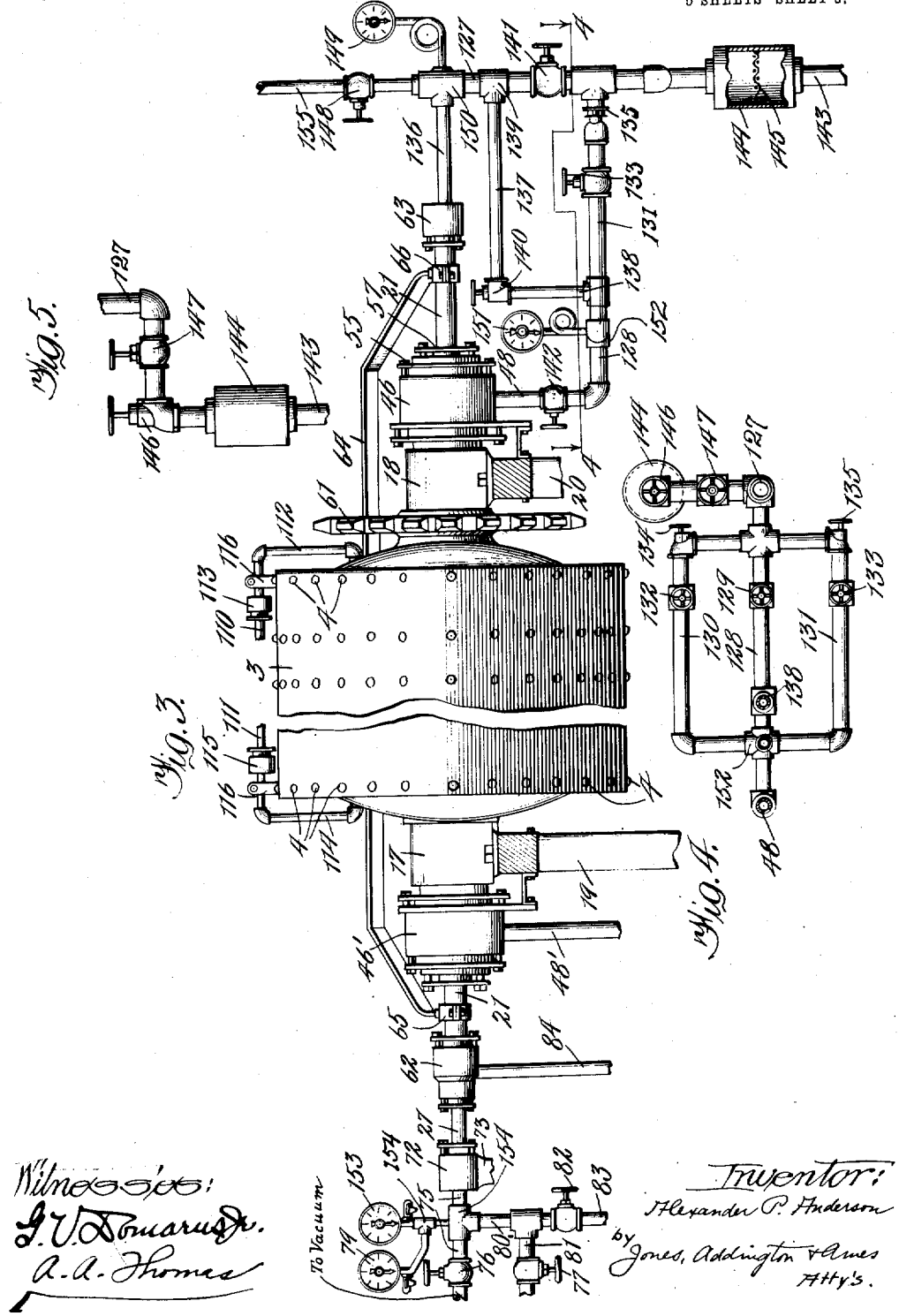

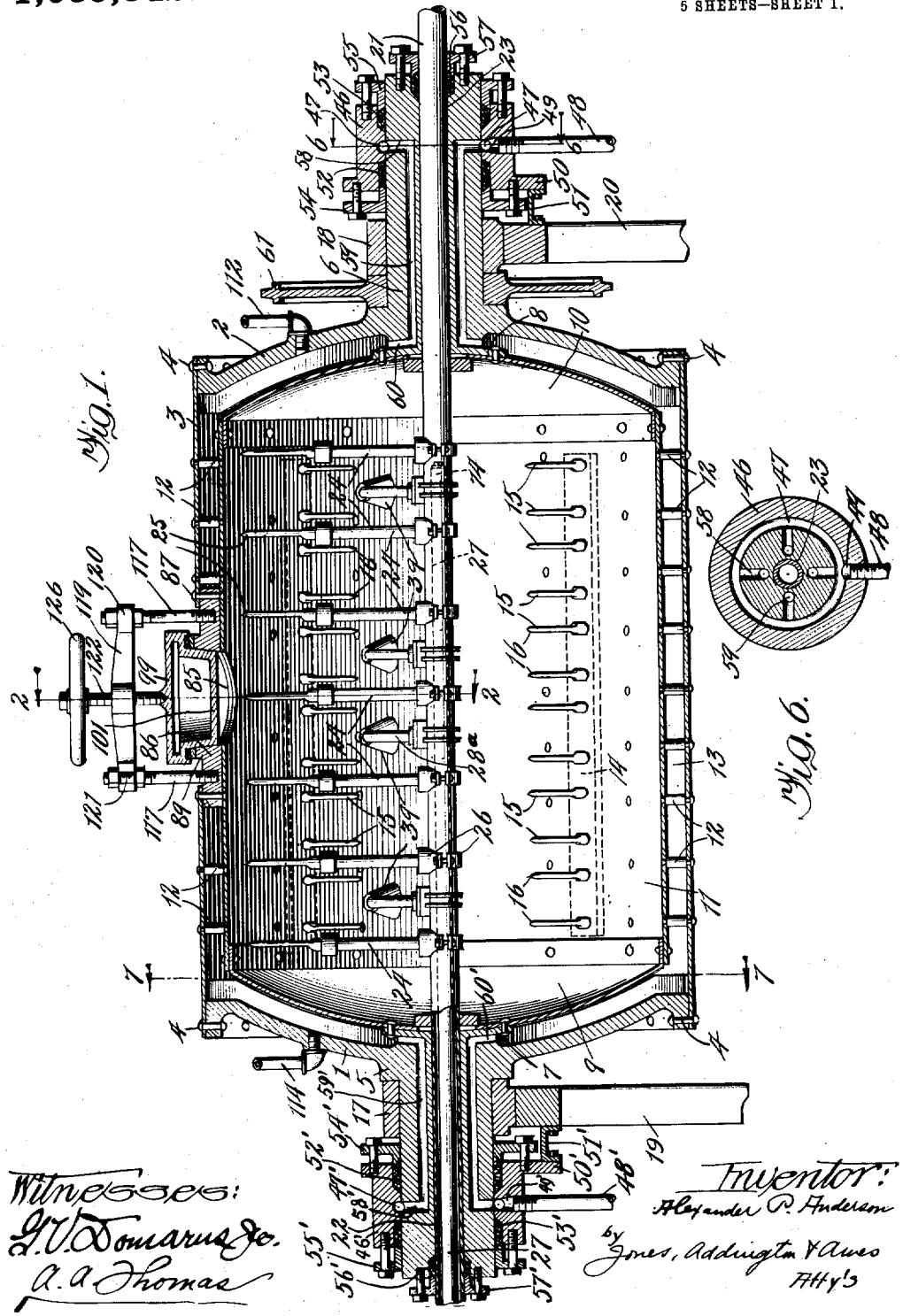

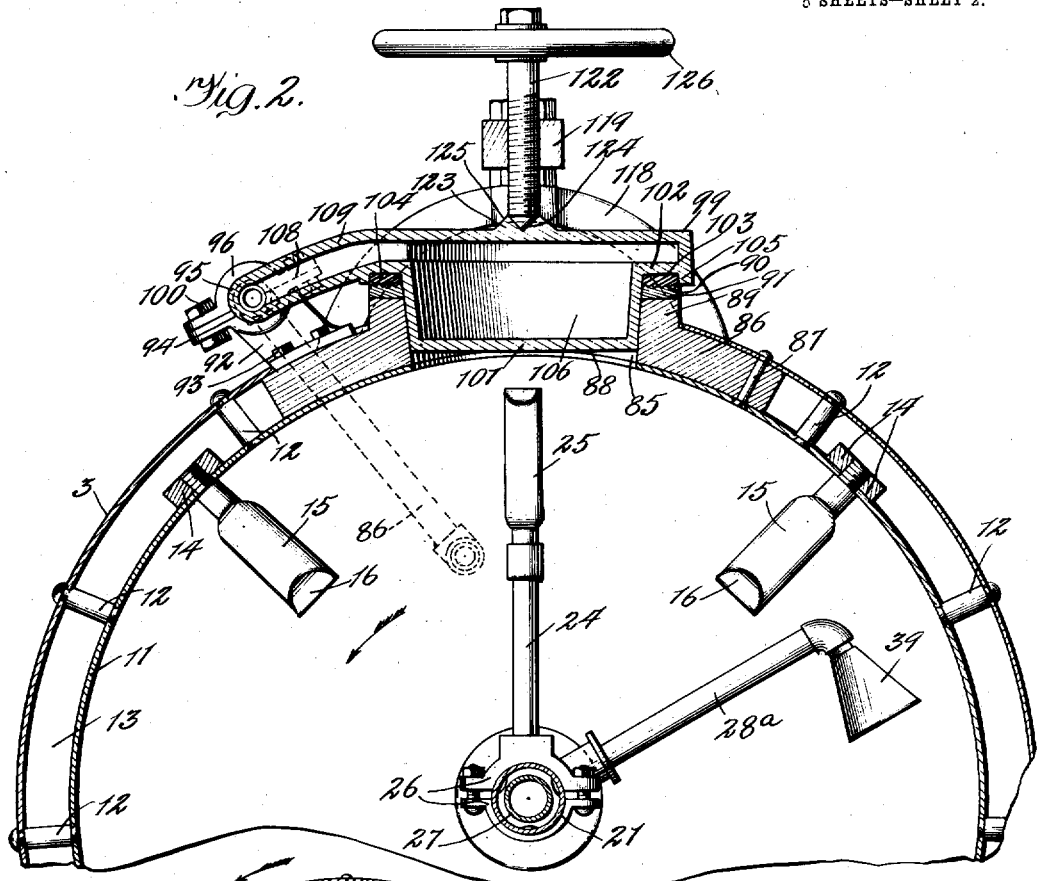

A. P. ANDERSON.
APPARATUS FOR THE TREATMENT OF STARCH MATERIALS.
APPLICATION FILED OCT. 14, 1907.
1,035,842.
Patented Aug. 20, 1912.
5 SHEETS—SHEET 4.
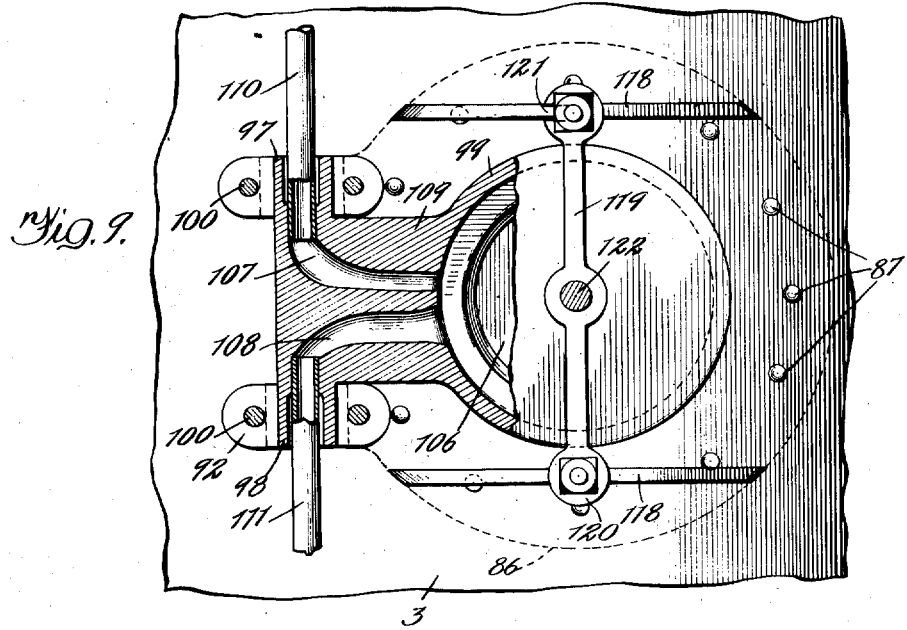
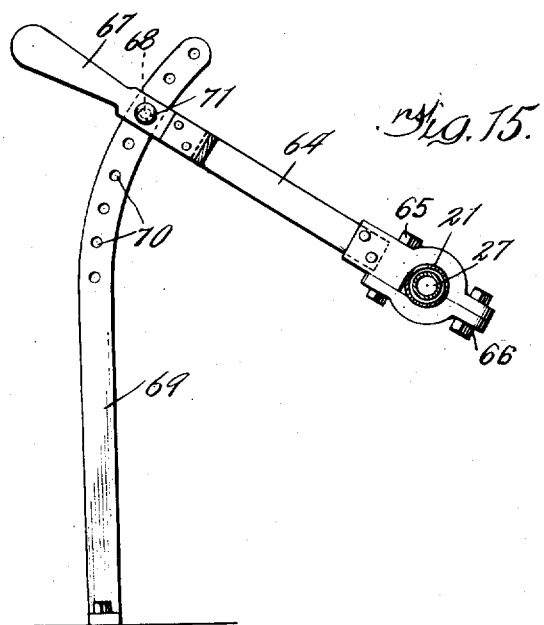
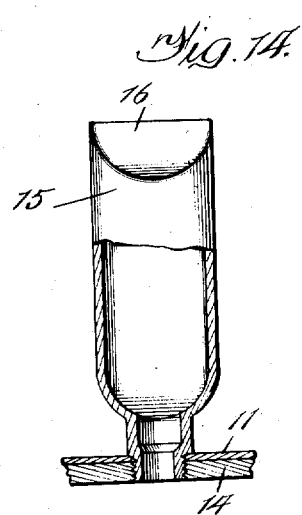
Witnesses:
Inventor:
Alexander P. Anderson
by Jones, Addington & Ames
Att'ys.

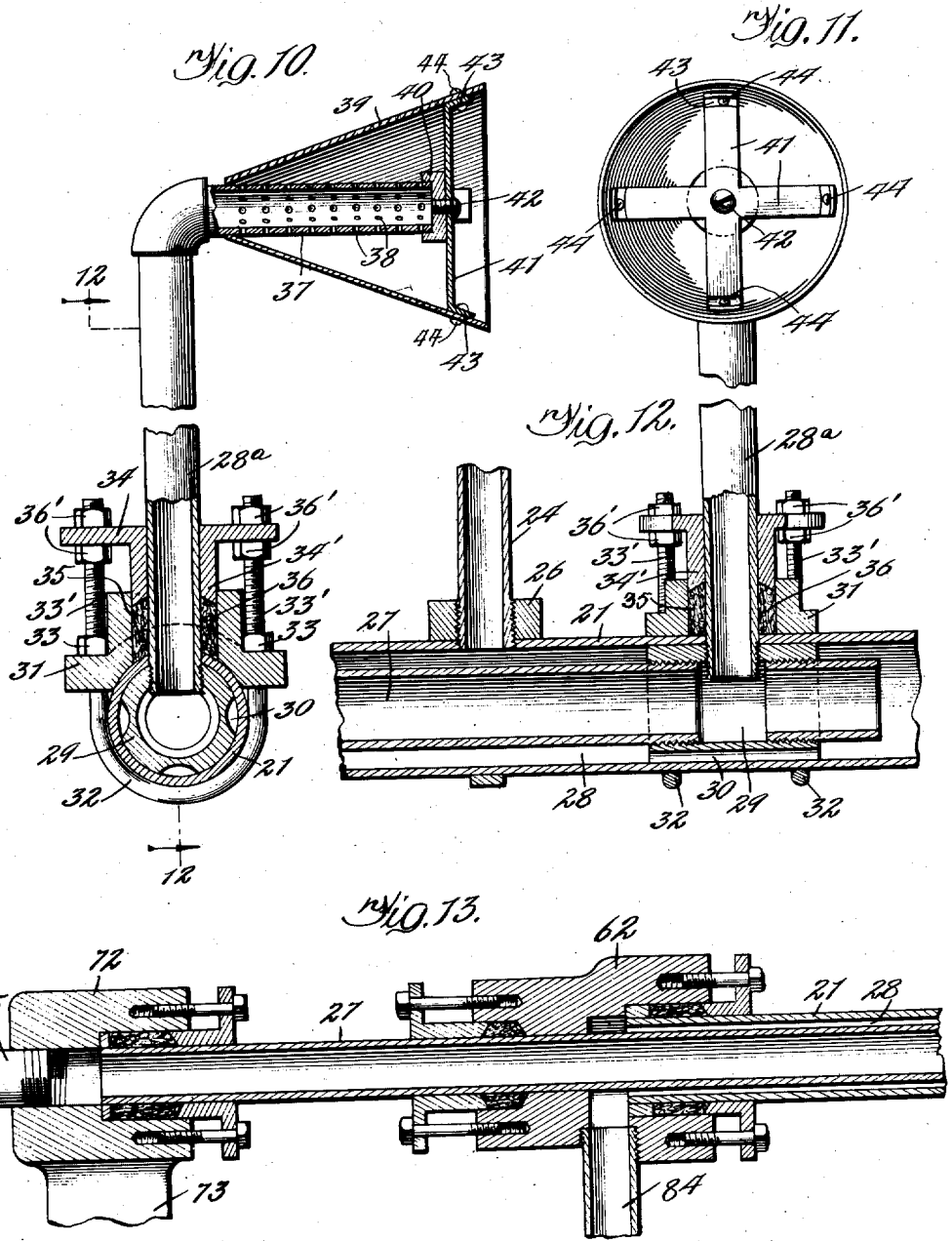

UNITED STATES PATENT OFFICE.

ALEXANDER P. ANDERSON, OF CHICAGO, ILLINOIS.

APPARATUS FOR THE TREATMENT OF STARCH MATERIALS.

1,035,842.  Specification of Letters Patent.   Patented Aug. 20, 1912.

Application filed October 14, 1907. Serial No. 397,324.

*To all whom it may concern:*

Be it known that I, ALEXANDER P. ANDERSON, a citizen of the United States, residing at Chicago, in the county of Cook and State of Illinois, have invented new and useful Improvements in Apparatus for the Treatment of Starch Materials, of which the following is a full, clear, concise, and exact description, reference being had to the accompanying drawing, forming a part of this specification.

This invention relates to apparatus particularly designed for the treatment of starch-materials of all kinds, although it may be used for treating other substances or materials; and it has for its object the provision of a drum of novel construction, together with various appurtenances and equipments, the purposes and uses of which will become apparent as the specification proceeds.

The apparatus herein described may be employed for carrying out the processes of pebbling and lumping starch and starch-containing material, such as described, for example, in my applications for patent, Serial No. 332,804, filed August 31, 1906, and Serial No. 397,325 filed October 14, 1907.

In the accompanying drawings, Figure 1 is a longitudinal sectional view of the drum, showing the interior construction of the same, as well as the connections for passing a heating or cooling fluid through the drum-jacket; Fig. 2 is a vertical cross-section on line 2—2 of Fig. 1, certain of the parts being for the sake of clearness shown in elevation; Fig. 3 is a general view in elevation of the apparatus, showing the system of piping connected to the drum for the purposes hereinafter set forth; Fig. 4 is a top view taken on line 4—4 of Fig. 3, showing a portion of the system of piping; Fig. 5 is a detail view showing the steam-filter, the main steam-valve and the main reducing-valve; Fig. 6 is a cross-sectional view on the line 6—6 of Fig. 1, showing a convenient arrangement for passing the steam from the admission-pipe through the hub of the cooker; Fig. 7 is a sectional view on line 7—7 of Fig. 1, showing the preferable arrangement of paddles or fins in one of the end heads; Fig. 8 is a detail view on line 8—8 of Fig. 7, showing the channel-like effect of the form of paddles or fins illustrated in Fig. 7; Fig. 9 is a top view of the lid or cover for the man-hole in the drum, certain of the parts being shown in cross-section, for the sake of clearness; Fig. 10 is a detail view, partly in section, of one of the exhaust-pipes, together with a suitable form of clamping device for securing it in place; Fig. 11 is a front view of the upper portion of the exhaust-pipe, showing the protecting hood secured to the free end of the pipe; Fig. 12 is a sectional view on line 12—12 of Fig. 10; Fig. 13 is a longitudinal sectional view of the two stuffing-boxes appearing at the extreme left of Fig. 3, showing certain pipe-connections hereinafter referred to; Fig. 14 is a detail view, partly in cross-section, of a stirrer-pipe, showing an effective way of securing it to the inner shell of the drum; and Fig. 15 is a view showing one arrangement for holding the central pipe in various adjusted positions.

The drum or cylinder comprises a pair of end heads 1 and 2, preferably of heavy cast metal, to which is secured the outer cylindrical section 3 by means of rivets 4. The section 3 and the end heads 1 and 2 constitute the outer shell. The end head 1 is provided with a hub 5, while the end head 2 is provided with a similar hub 6. The inner ends of these hubs have peripheral flanges or shoulders 7 and 8, to which are riveted the end members 9 and 10, respectively. To these end members is secured the inner cylindrical section 11, spaced from the outer section by stay-bolts 12. The section 11 and its end members 9 and 10 constitute the inner shell. There is thus formed a space or jacket 13, which surrounds the inner shell of the cooker.

As indicated in dotted lines in Fig. 1 and as shown cross-sectionally in Fig. 2, the inner shell has secured thereto upon its outer surface a series of ribs or strips 14 into which are screwed the cutter- or stirrer-pipes 15, to communicate with the jacket. It will be noticed that the free ends of these pipes are closed, so that any heating or cooling fluid admitted into the jacket will enter said pipes without passing therethrough. In the present instance I have shown these pipes of a construction indicated in Figs. 2 and 14,—that is to say, the pipes are flattened in a plane transverse to the longitudinal axis of the cooker, for the purpose of cutting or breaking large lumps of the material that may be rolled against said flattened edges during the rotation of the drum. This cutting or breaking property of the stirrer-pipes may be increased by providing them at their closed ends with a thinned edge 16,—although this is by no means necessary. Of course, the configuration of these pipes may be varied at will. Ordinary round pipes may be used; in which case they might do little or no cutting or breaking of lumps, but they would stir the material during the rotation of the drum just as effectively as the pipes herein shown. The number of these stirrer-pipes in a row, as well as the number of rows, is purely a matter of choice. For the sake of illustration I have shown the drum provided with four rows or series of stirrer-pipes.

The drum is rotatably supported by the hubs 5 and 6 in suitable bearing blocks 17 and 18 mounted on standards 19 and 20. Passing longitudinally through the cooker is a stationary central pipe 21 which rests snugly in bores 22 and 23 in the hubs 5 and 6, without interfering with the free rotation of the hubs. To the central pipe 21 within the drum is attached a series of pipes 24 which I call the breaker-pipes. These breaker-pipes are, like the stirrer-pipes 15, closed at their free ends and may be of any suitable construction. As shown, the breaker-pipes consist each of two parts: the upper portions 25 being similar in construction to the pipes 15 and suitably secured to the inner portions. As above mentioned in connection with the stirrer-pipes, it is clear that the breaker-pipes may likewise be of any desired shape,—such as, cylindrical throughout their entire length. For rigidly securing the breaker-pipes to the central pipe I employ suitable clamps 26 into the upper members of which the pipes are screwed to communicate with the interior of the central pipe, as shown in Fig. 12. In this way any heating or cooling fluid admitted into the said pipe will enter the breaker-pipes without passing therethrough. A second pipe 27 is concentrically arranged within the central pipe 21 and is of sufficiently smaller diameter than the pipe 21 to leave a space 28 between the two pipes, as shown to the left of Fig. 1, and in Figs. 12 and 13. For mechanical reasons I prefer to have the inner pipe 27 in sections secured together by couplings 29 (see Figs. 10 and 12). In order not to interrupt the effective continuity of the space 28 between the pipes 21 and 27, I provide these couplings with grooves 30 through which the heating or cooling fluid passes as it moves along through the space 28 within the drum. Communicating with the interior of pipe 27 are the exhaust-pipes 28ᵃ rigidly secured in position on the central pipe 21 in any preferred way. As shown in Figs. 10 and 12, the lower end of each pipe 28ᵃ is screwed into a coupling 29. The stuffing-box 31 is firmly clamped to the pipe 21 by a pair of U-shaped strips or yokes 32.

By means of nuts 33 engaging the screw-threaded portions 33' of the yokes, the stuffing-box 31 may be drawn tightly against the pipe 21. The screw-threaded portions of these yokes extend upwardly a sufficient distance to hold in place the gland 34, the projecting lower end 34' of which rests in the upper portion of the circular groove or channel 35 formed between the pipe 28ᵃ and the opening in the stuffing-box 31. This channel harbors a suitable packing 36 to prevent leakage of steam or other fluid through the joint between the pipe 28ᵃ and the coupling 29. The position of the gland 34 may be adjusted by means of the nuts 36' to vary the degree of compression of the packing.

As shown in Figs. 2 and 10, the upper portions 37 of the pipes 28ᵃ are bent substantially at right angles to the main portions, and are provided with perforations 38 whereby communication is established between the interior of the drum and the pipe 27. By reference to Fig. 2 it will be noticed that the exhaust-pipes 28ᵃ are set back at an angle relative to the breaker-pipes 24. The object of this angular displacement of the pipes 24 and 28ᵃ on the pipe 21 is to keep the free ends of the pipes 28ᵃ clear of the material under treatment when the breaker pipes 24 are turned down into the material (in the direction indicated by the arrow in Fig. 2) for breaking up any masses that are too large to pass in between the pipes 15 and 24. With the breaker-pipes 24 thus turned down into the material, the pipes 28ᵃ will remain clear of the same and will not therefore be in danger of having their perforated free ends clogged. As a further prevention of such clogging it may be desirable to provide the free ends of the pipes 28ᵃ with hoods 39. One convenient way of attaching these hoods is shown in Figs. 10 and 11. The outer end of the pipe 28ᵃ is closed by a cap 40 screw-threaded on to the perforated portion 37. Strips 41, either integral or separate, are secured to the cap by a screw 42. The outer ends of these strips are curved as shown at 43 to conform to the inner surface of the hood at that point, and are secured to the hood by screws or rivets 44.

I shall now describe the connections whereby any suitable heating or cooling fluid may be passed through the jacket. Referring to Figs. 1 and 6, it will be seen that the stuffing-box 46 is provided with a circular groove 47 forming what may be termed a steam-space. To the lower portion of the stuffing-box is secured a pipe 48 adapted to be connected with the source of fluid-supply, as hereinafter explained. The radial opening 49 in which this pipe is secured in the stuffing-box communicates with the steam-space 47. Although the pipe 48 and its connections might be sufficient to prevent rotation of the stuffing-box, yet I positively forestall any such possible rotation by connecting the flange 50 in the stuffing-box with the standard 20 by means of a brace or bracket 51. The packings 52 and 53 are held in place by the glands 54 and 55, respectively, secured in the stuffing-box. The packing 56 at the extreme end of the hub 6 is held in place by the gland 57 secured to the hub. The radial passages 58 in the hub are in alinement with the space 47 so as to communicate therewith. At their inner ends these radial passages communicate with the longitudinal openings 59 in the hub. These longitudinal openings in turn connect with the radial passages 60 formed in that portion of the end-head 2 which projects into the jacket, as shown in Fig. 1.

The above described arrangement at the right of Fig. 1 for the admission of a suitable heating or cooling fluid through the hub 6 into the jacket 13 is substantially duplicated at the left of Fig. 1 to permit the exit of the heating or cooling fluid from the jacket through the hub 5. For this reason I deem it quite unnecessary and superfluous to reiterate in detail the said arrangement at the left of Fig. 1, whereby the heating or cooling fluid is allowed to escape from the jacket. All that need be said with reference to a description of said arrangement at the left of Fig. 1 is that the parts numbered 46 to 60, inclusive, as set forth in the immediately preceding paragraph, are for convenience shown in duplicate at the left of Fig. 1, and numbered, respectively, 46' to 60', inclusive.

Having thus described the structure of the drum together with the arrangement for passing a heating or cooling fluid through the jacket, I shall now direct attention to the operation of the device as thus far set forth: A sufficient amount of the material desired for treatment is put into the drum whereupon the latter is sealed air-tight by a suitable lid,—my novel form of lid to be described presently. The drum is then set in rotation, as by connecting it with a source of power through the gear-wheel 61 rigidly secured to one of the hubs. At the same time a heating fluid, such as steam, is turned into the jacket, entering hub 6 through pipe 48, and passing out of the jacket through hub 5 into the drain- or return-pipe 48'. The steam is also fed into the central pipe 21 from the right as shown in Fig. 1, by connections to be explained later. Bearing in mind the arrangement of the stirrer-pipes 15 and the breaker-pipes 24, it will be apparent that the steam in the jacket enters the stirrer-pipes to heat the same uniformly with the entire inner surface of the drum, and that the steam passing through the central pipe 21 enters the breaker-pipes whereby the same become heated uniformly with the central pipe. And if the same pressure of steam is turned into the jacket as into the central pipe, it follows that the parts just mentioned (to-wit, the inner surface, the stirrer-pipes, the central pipe and the breaker-pipes) become subjected to a substantially uniform heating. During the rotation of the drum the material is continuously rolled and tumbled about, the presence of the stirrer-pipes 15 increasing the agitation of the material. Furthermore, should these pipes be provided with edges, as above mentioned, it is likely that masses of the material encountering such edges would be split or broken. However, in case it is desired to positively break up large lumps, the central pipe 21, which will ordinarily remain stationary, may be rocked in the direction indicated by the arrow in Fig. 2. Such rocking is permitted by mounting the ends of the central pipe in ordinary stuffing-boxes 62, 63. Fig. 13 shows a cross-sectional detail of the mounting of the pipe in stuffing-box 62. I have shown a lever 64 firmly clamped at 65 and 66 to the central pipe whereby the same may be rotated to bring the breaker-pipes down into the material. Looking at Fig. 1 it will be noticed that the stirrer-pipes 15 are arranged in pairs, while the breaker-pipes are arranged to enter the space between each pair of stirrer-pipes. Therefore, with the breaker-pipes turned into the tumbling material, it follows that any masses or lumps too large to pass in between the movable stirrer-pipes and the stationary breaker-pipes, will be crushed or broken. By this means the material is broken up into pieces more or less uniform in size. By pressing down upon the lever 64 the breaker-pipes may be restored to the position shown in Fig. 2, although it is not necessary that they be in a vertical position to be clear of the material. In Fig. 15 I have illustrated a simple arrangement for securing the lever in various adjusted positions.

The handle 67, attached to the lever, has an opening 68. A standard 69 is provided with a series of openings 70 arranged in an arc whose center is coincident with the center of pipes 21 and 27. By withdrawing the pin 71 the lever is free to be moved into any position within limits, and is secured in its adjusted position by passing the pin through the opening 68 in the handle and the corresponding opening 70 in the standard 69. Continuing the description of the operation: The rocking of the central pipe 21 is necessarily accompanied by movement of the inner pipe 27, as appears from Fig. 12. Rocking of the pipe 27 is permitted by mounting the outer end thereof in a stuffing-box 72, as shown in Fig. 13. Undue jarring of this stuffing-box may be readily obviated by bracing it on a support 73 attached to the floor. The inner end of this pipe 27 is, of course, closed as indicated in dotted lines at 74 in Fig. 1 beyond the last of the exhaust-pipes 28. In this way, communication between the pipes 21 and 27 is shut off. The outer end of the pipe 27 is connected in the stuffing-box 72 with the pipe 75 (see Fig. 13) which leads to a condenser and vacuum pump (as indicated to the left of Fig. 3). By opening valve 76 and closing valves 77 and 82, the interior of the drum may be subjected to the action of the vacuum pump through exhaust-pipes 28, inner pipe 27, and connecting pipe 75. A vacuum gage 79 indicates the degree of the vacuum. In order, however, that it may be possible to subject the interior of the drum to the action of steam, I provide a pipe 80 leading from pipe 75. Connecting with pipe 80 is a branch-pipe 81 through which the steam enters pipe 80. By closing valves 76 and 82, and opening valve 77, steam may be admitted into the drum. By closing valves 76 and 77 and opening valve 82, the interior of the drum communicates with the atmosphere through pipe 83. It should be mentioned in connection with the central pipe 21 that the left end thereof connects with the drain- or return-pipe 84 in the stuffing-box 62, as clearly shown in Fig. 13.

In order to effect the proper drainage of the jacket, I make use of the expedient illustrated in Fig. 7. The end head 1 is provided with a series of radially arranged paddles or pins 84ᵃ, preferably cast integral therewith. These paddles are so disposed with respect to passages 60′ in the hub 5, that the water carried up by the paddles during the rotation of the drum (as indicated by the arrow in Fig. 7) will run into said passages, from where it passes through the openings 59′ into the drain-pipe 48′. It may be preferable to give the paddles a sort of trough-like curve transversely, as well as an upward curve longitudinally, as shown cross-sectionally in Fig. 8, whereby the water would be held as in a channel.

Access into the interior of the drum is afforded through an opening or man-hole 85 formed in the casting 86. This casting is secured to the shells in the space or jacket 13 formed therebetween by rivets 87. The inner shell has, of course, an opening 88 in alinement with the opening 85 in the casting. The circular projection 89 of the casting is provided with a grooved or roughened surface 90. This surface may be provided either directly on the casting itself, or on a ring 91 separately secured to the casting, as by screws. I prefer the latter arrangement for the reason that in case the grooved surface should in any way become injured, it would only be necessary to remove the ring 91 and to replace it by a new one. Otherwise, it would be necessary to replace the entire casting,—a rather costly method of repair. A pair of supports 92 are secured to the casting by bolts or screws 93 and provided with bearing surfaces 94 which coöperate with corresponding surfaces 95 on the plates 96 to form bearings for the hollow trunnions 97 and 98 of the lid 99. The plates 96 are removably secured to the supports 92 by bolts 100. It will be observed that the cover is hollow,—that is to say, it is provided with a passage therethrough whereby a suitable heating or cooling fluid may be admitted into the lid. The central hollow portion 101 of the lid projects into the opening of the casting to fit snugly within the same, as shown in Figs. 1 and 2. The peripheral projection 102 has formed therein a groove or channel 103 containing a gasket 104 of soft metal; so that, when the cover is forced against the casting the exposed surface of the gasket and the roughened surface 90 will coöperate to produce a sealed, air-tight joint. The flange 105 serves to prevent displacement of the gasket. The hollow 106 in the central portion 101 communicates with the channels 107 and 108 formed in the neck or extension 109 of the lid, as shown in Figs. 2 and 9. Secured in the trunnion 97 is a pipe 110 which communicates with the channel 107. Similarly, a pipe 111 is attached to the trunnion 98 to communicate with the channel 108. With this arrangement, any heating or cooling fluid entering the channel 107 through the pipe 110 will pass into the hollow portion of the lid to heat or cool the same (as the case may be), and leave through the channel 108 to be carried away by the pipe 111.

One convenient way of passing the heating or cooling fluid through the lid with the arrangement just described, is to include the pipes 110 and 111 in a by-pass around the cooker. This is readily done by tapping the jacket in the end head 2 with a pipe 112, as shown in Figs. 1 and 3, and leading said pipe into the stuffing-box 113 where it communicates with the pipe 110. A second pipe 114 is attached to the end head 1 to communicate with the jacket at that end, and is led into the stuffing-box 115 where it communicates with the pipe 111. The pipes 112 and 114 are fastened to the cooker by means of suitable supports 116 on the outer shell. Inasmuch as the lid is pivotally supported on the standards 92, it follows that the pipes 110 and 111 rotate with the trunnions when the lid is pivoted in its bearings. With these pipes rigidly secured in the trunnions, it is therefore necessary to provide the stuffing-boxes 113 and 115 to effect a steam-tight connection between the rotatable pipes 110, 111, and the corresponding stationary pipes 112 and 114. When I refer to the pipes 112 and 114 as "stationary," I mean that they are stationary so far as the pivoted lid with its rotatable pipes 110 and 111 are concerned. Of course, one might mount the pipes 110 and 111 loosely in the trunnions, so that said pipes would remain stationary with respect to the rotatable trunnions. In such instance the stuffing-boxes 113 and 115 could be dispensed with; but, in lieu thereof, it would be necessary to make a steam-tight movable connection between pipes 110, 111, and the trunnions 97, 98, respectively. It will thus be seen that some of the heating or cooling fluid admitted into the jacket through the openings 60 will pass into the pipe 112, thence into the pipe 110, thence into and through the lid, as above described, thence through pipes 111 and 114 back into the jacket at the other end of the cooker.

To permit of the ready and rapid sealing and unsealing of the lid I have made the following provisions: A pair of upright members 117 are secured to the casting and preferably braced by the side-pieces 118, which bear against the casting at their outer ends, as seen in Fig. 9. These upright members are connected by a cross-bar 119 which is pivoted at 120 to one of the members 117. The other end of the cross-bar is formed with a jaw at 121 to receive the other upright member 117. Adjustably mounted in this cross-bar, as by screw-threading, is a central member 122 which at its lower end bears against the top surface of the lid. I may provide the top of the lid with a central boss 123 having a conical depression 124, into which fits the correspondingly tapered lower end 125 of the central member, whereby a firm and steady contact between the lid and the central member is insured. A hand-wheel 126 is attached to the central member whereby the same may be easily manipulated for adjustment toward or away from the lid. When it is desired to release the lid, it is only necessary to raise the central member 122 out of engagement with the lid and to swing the crossbar 119 aside out of the path of the lid, which is then free to be moved on its pivots. This swinging aside of the cross-bar is permitted by the pivotal connection between said bar and one of the members 117 and the slotted engagement with the other member.

I now come to the description of the system of piping whereby I am enabled to admit steam into the jacket and the central pipe 21 from the same source of supply through independent paths, and to control and regulate separately the passage of steam through these independent paths. The pipe 48 is directly connected with the main pipe 127 by a pipe 128. As seen in Fig. 4, the pipe 128 is provided with an ordinary steam-valve 129 around which is a by-pass 130. Although I have shown a second similar by-pass 131 around the valve 129, yet it is by no means necessary for the accomplishment of the end in view that both by-passes be present. However, as will appear later, the presence of both by-passes renders possible a more varied regulation of the pressure under which steam may be fed separately into the central pipe 21 and the jacket 13. The by-passes 130 and 131 are provided with reducing valves 132 and 133, respectively, which should be set for different reducing powers. Furthermore, by-pass 130 has an ordinary steam-valve 134, while by-pass 131 has an ordinary steam-valve 135. The stuffing-box 63 serves to form an air-tight joint between the central pipe 21 and the branch pipe 136 which is connected with the main pipe 127. A by-pass 137 is connected at one end 138 with the pipe 128, and at its other end 139 with the main pipe 127. This by-pass 137 is provided with an ordinary steam-valve 140. A steam-valve 141 is located in the main-pipe between the connections therewith of pipe 128 and by-pass 137. A steam-valve 142 is also provided in the pipe 48.

The operation of this system of piping is as follows: Let it be supposed that steam enters from a suitable source of supply through the pipe 143, thence preferably into and through a steam-filter 144 in which such foreign matter as boiler-scales is prevented by the screen 145 from being carried along with the steam. With the main steam-valve 146 open the steam passes into the main reducing-valve 147 where it is reduced to any suitable predetermined pressure. Thence it enters the main pipe 127. If valve 141 is open, the steam will pass directly through main pipe 127 into branch pipe 136 (the valve 148 being, of course, closed), and thence into the central pipe 21, through the space 28 formed between the pipes 21 and 27, and into the breaker-pipes 24,—as already described. From the central pipe 21 the steam passes through the stuffing-box 62 into pipe 84 (see Fig. 13), from where it is conveniently led back into the boiler. With the valves 134, 135 and 140 closed and the valves 129 and 142 open, it will be apparent that the steam will pass into the jacket directly from main pipe 127 through the branch pipe 128, into pipe 48, thence into and through the jacket 13 after the manner already described. With the valves in the positions above mentioned, the pressure at which the steam enters the central pipe and the jacket is determined by the main reducing-valve 147. In case, however, it should be desired to still further reduce the pressure of the steam that is to enter the jacket, without a further reduction in the pressure of the steam that is to pass into the central pipe, it is only necessary to close valve 129 and to open valve 134 (or valve 135, as the case may be). In this event the steam will pass directly through main pipe 127 into the branch pipe 136, and thence into the central pipe 21. But in order to get into the jacket, the steam is now compelled to enter the by-pass 130, where it passes through the reducing-valve 132, and thence into the jacket through the pipe 48. In case by-pass 131 is employed, a different reduction in the steam-pressure may be effected by opening the valve 135 instead of the valve 134, in which event the steam would pass through the reducing valve 133 in the by-pass 131. Again, should it be desired to pass the steam through the reducing valve 132 (or 133) into both the central pipe and the jacket, it is only necessary to close the valve 141 and open the valve 140. Under these conditions the steam is forced to go through the by-pass 130 (or 131) into the pipe 48, and thence into the jacket; some of the steam branches from said by-pass into the by-pass 137, thence through the main pipe 127 into the branch pipe 136 from which it enters the central pipe 21.

It will thus be apparent that by my novel system of piping and distribution of valves I am enabled to pass the steam from the main reducing-valve 147 directly into the central pipe 21 as well as into the jacket; or directly into the central pipe and through an auxiliary reducing-valve into the jacket; or through the auxiliary reducing-valve into both the central pipe and the jacket. By thus having under control the pressure at which the steam is to enter the jacket and the breaker-pipes, I am enabled to produce the proper and necessary regulation of the temperature to which the material under treatment is to be subjected. The pressure of the steam that passes into the central pipe and the breaker-pipes is indicated by a gage 149 attached to the T-shaped connection 150. The pressure of the steam in the jacket is indicated by a gage 151 attached to the joint 152 in the pipe 128. I might here add that the pressure to which the interior of the drum may be subjected is indicated by the gage 153 attached to the T-joint 154 that connects pipe 75 with pipe 80.

In case it should be desired to pass either hot, or cold water into the jacket and the shaft, it is only necessary to close the valves 146 and 141 and to open the valve 148 (it being assumed, of course, that the valves 140 and 142 are open). In such event, the pipe 155 being connected with a suitable source of hot or cold water-supply, the water will pass through the branch 136 into the central pipe 121. It will also enter the by-pass 137, pass into the branch 128, thence through the pipe 48 into the jacket. Should it be desired to pass the water only into the central shaft, either the valve 140 or the valve 142 is closed.

I am aware of the fact that many of the various features herein set forth may be used independently of other features without sacrificing any of the advantages to be derived. Thus, my novel system of piping for regulating and controlling the passage of steam from a source of supply into different parts of the drum, does not depend for its utility or operativeness upon the particular form of drum shown. Again, it is clear that my improved lid may be used in conjunction with a drum different from that disclosed.

Having described my invention what I claim as new, and desire to secure by Letters Patent of the United States, is—

1. In apparatus for treating starch-material, a rotatable drum having therein a plurality of projections movable with the drum, other projections normally stationary for breaking up large masses of the material under treatment during the rotation of the drum, and means for moving said other projections when desired from the outside of said drum.

2. In apparatus for treating starch-material, the combination with a rotatable drum having therein a plurality of relatively movable projections for breaking up any large masses of the material under treatment during the rotation of the drum, of means outside the cooker for adjusting a portion of said projections independently of the others.

3. In apparatus for treating starch-material, the combination with a drum having therein a plurality of radial projections relatively movable for breaking up any large masses of the material under treatment during the rotation of the drum, of means outside the drum for circumferentially adjusting certain of said projections independently of the drum.

4. In apparatus for treating starch material, the combination with a drum having projections secured to the inner wall thereof, of stationary projections supported within the drum to coöperate with said first-mentioned projections for breaking up large masses of the material under treatment during the rotation of the drum, and means for circumferentially adjusting said stationary projections to move the same into or out of breaking position.

5. In apparatus for treating starch-material, the combination with a drum having projections secured to the inner wall thereof, of a stationary pipe passing longitudinally through the drum, and means carried by said pipe to coöperate with said projections for breaking up large masses of the material under treatment during the rotation of the drum and means for rocking said pipe.

6. In apparatus for treating starch material, in combination, a drum having stirrer-pipes secured to the inner wall thereof, a stationary pipe passing longitudinally through the drum, and breaker-pipes carried by said pipe to coöperate with said stirrer-pipes for breaking up large masses of the material under treatment during the rotation of the drum, and means for heating said stirrer-pipes and breaker-pipes.

7. In apparatus for treating starch-material, in combination, a drum having stirrer-pipes secured to the inner wall thereof, a stationary pipe passing longitudinally through the drum, breaker-pipes carried by said stationary pipe to coöperate with said stirrer-pipes for breaking up large masses of the material under treatment during the rotation of the drum, and means for circumferentially adjusting said stationary pipe to control the position of the breaker-pipes with respect to the coöperating stirrer-pipes.

8. In apparatus for treating starch-material, in combination, a drum having pipes secured to the inner wall thereof, stationary pipes supported within the drum to coöperate with said first-mentioned pipes for breaking up large masses of the material under treatment during the rotation of the drum, and means whereby a suitable heating or cooling fluid may be admitted into said first-mentioned pipes while the drum is being rotated.

9. In apparatus for treating starch-material, in combination, a drum having pipes secured to the inner wall thereof, stationary pipes supported within the drum to coöperate with said first-mentioned pipes for breaking up large masses of the material under treatment during the rotation of the drum, means for circumferentially adjusting the position of the stationary pipes, and means whereby a suitable heating or cooling fluid may be admitted into said pipes.

10. In an apparatus for treating starch material, the combination with a rotatable drum having stirring members, of breaking members normally elevated out of the material being treated but adapted to be moved into said material to coöperate with the stirring members, and means for moving the breaking members.

11. In apparatus for treating starch-material, the combination with a rotatable drum, of stationary pipes within the same for connecting the interior thereof with a source of fluid-supply during the rotation of the drum, and means outside the cooker for adjusting the position of said pipes in radial planes.

12. In apparatus for treating starch-material, in combination, a rotatable drum, a stationary central pipe projecting longitudinally thereinto, pipes within the drum connected at one end with said central pipe for establishing communication therethrough between the interior of the drum and either a source of fluid-supply or exhausting means during the rotation of the drum, and means outside the cooker for rotarily adjusting said central pipe.

13. In an apparatus for treating starch material, in combination, a rotatable drum, a pair of concentric pipes within and coaxial with the axis of rotation of the drum, hollow members communicating with one of said pipes and closed at their free ends, a fluid supply for said pipe, other members establishing communication between the interior of the drum and the other pipe, and means for connecting said other pipe with exhaust means or a source of fluid supply as desired.

14. In apparatus for treating starch-material, in combination, a rotatable drum, a series of pipes stationarily supported within the same, a portion of said pipes being closed at their free ends whereby a heating or cooling fluid may be admitted into said pipes without passing therethrough, the others of said pipes being open at their free ends whereby the interior of the drum may be connected with exhausting means during the rotation of the drum.

15. In apparatus for treating starch-material, in combination, a drum, a central pipe passing longitudinally therethrough, a series of breaker-pipes secured to said central pipe within the drum, said braker-pipes being closed at their free ends, a second series of pipes carried by said central pipe and open at their free ends, means for admitting a heating or cooling fluid into said breaker-pipes, means for connecting the interior of the drum with exhausting means or a source of fluid-supply, as desired, through said second series of pipes, and means outside the drum for rotarily adjusting said central pipe to turn said breaker-pipes into the material under treatment during the rotation of the drum for breaking up large masses of the material, said second series of pipes being set at an angle to said breaker pipes whereby, when the latter are turned down into the material, the free ends of said second series of pipes will remain clear of the material to prevent clogging.

16. In apparatus for treating starch-material, in combination, a drum, a central pipe passing longitudinally therethrough, a series of breaker-pipes secured to said central pipe within the drum, said breaker-pipes being closed at their free ends, a second series of pipes carried by said central pipe and open at their free ends, means for admitting a heating or cooling fluid into said breaker-pipes, means for connecting the interior of the drum with exhausting means or a source of fluid-supply through said second series of pipes, and means outside the drum for rotarily adjusting said central pipe to turn said breaker-pipes into the material under treatment during the rotation of the drum for breaking up large masses of the material, said second series of pipes being set at an angle to said breaker-pipes and provided each with a hood at its free end whereby, when the breaker-pipes are turned down into the material, said hooded free ends will remain clear of the material to prevent clogging.

17. In apparatus for treating starch-material, in combination, a rotatable drum, a central pipe passing longitudinally therethrough, an inner pipe concentrically arranged within said central pipe and spaced therefrom, a series of pipes within the drum, a portion of said pipes communicating each at one end with the interior of one of said concentric pipes and having their free ends closed whereby a heating or cooling fluid may be admitted into said pipes and held therein, the others of said series of pipes communicating each at one end with the interior of the other of said concentric pipes and having their free ends open whereby the interior of the drum may be connected with exhausting means or a source of fluid-supply during the rotation of the drum.

18. In apparatus for treating starch-material, the combination with a jacketed rotary drum, of a hollow lid therefor having a pair of channels communicating with the interior of the lid, and means in constant communication with said channels whereby through one of said channels a heating or cooling fluid is admitted into the lid, and through the other of said channels the fluid passes out of the lid.

19. In apparatus for treating starch-material, the combination with a jacketed rotary drum, of a lid therefor provided with a pair of hollow trunnions about which it is pivotally supported, and a pipe leading to each of said trunnions, said lid having a passage therein for establishing communication between said pipes through the lid, whereby a heating or cooling fluid is passed through the lid.

20. In apparatus for treating starch-material, the combination with a jacketed rotary drum, of a hollow lid therefor having a pair of channels communicating with the interior of the lid, a pair of hollow trunnions which communicate with said channels and about which the lid is pivotally supported on the cooker and a pipe leading to each of said trunnions, whereby a heating or cooling fluid may enter the lid through one of said pipes and leave the same through the other pipe.

21. In apparatus for treating starch-material, in combination, a jacketed drum, a casting secured to said drum, said casting being provided with an opening to permit access to the interior of the drum, a lid for the opening in said casting, said lid having a steam space communicating with the jacket of the drum, a pair of upright members secured to the casting on opposite sides of said lid, a cross-bar movable independently of said lid and normally carried by said members, and a central member adjustably mounted on said cross-bar for engaging the lid to force the same against the casting to effect a tight closure.

22. In apparatus for treating starch-material, in combination, a drum comprising two cylindrical shells arranged one within the other to form a space around the inner shell, a casting secured to said shells in the space therebetween, said casting and inner shell being provided with alined openings to permit access to the interior of the drum, a hollow, hinged lid for the opening in said casting, means for passing a fluid into said lid through its hinge, a pair of upright members secured to the casting on opposite sides of said lid, a cross-bar pivoted at one end to one of said members and having a jaw at its other end for engaging the other member, whereby said cross-bar may be swung aside out of the path of the lid, and a central member adjustably mounted on said cross-bar for engaging the lid to hold the same closed.

23. In apparatus for treating starch-material, the combination with a drum comprising two cylindrical shells arranged concentrically one within the other to form a space or jacket inclosing the inner shell, said cylindrical shells having end heads forming end chambers, one of the end chambers thus formed having openings leading therefrom, of a series of paddles in said chamber for carrying water from the bottom of the chamber to the said openings through which it passes out of the chamber, during the rotation of the drum.

24. In apparatus for treating starch-material, the combination with a drum comprising two cylindrical shells arranged concentrically one within the other to form a space inclosing the inner shell, said cylindrical shells having end heads forming end chambers, one of the end chambers thus formed having openings leading therefrom, of a series of paddles in said chamber cast integral with the outer end head for carrying water from the bottom of the chamber to the said openings through which it passes out of the chamber, during the rotation of the drum.

25. In apparatus for treating starch-material, the combination with a drum comprising two cylindrical shells arranged concentrically one within the other to form a space inclosing the inner shell, said cylindrical shells having end heads forming end chambers, one of the end chambers thus formed having openings leading therefrom, of a series of curved, trough-like paddles radially arranged in said chamber for carrying water from the bottom of the chamber to the said openings through which it passes out of the chamber, during the rotation of the drum.

26. In apparatus for treating starch-material, the combination with a drum comprising two cylindrical shells arranged concentrically one within the other to form a space inclosing the inner shell, said cylindrical shells having end heads forming end chambers, one of the end chambers thus formed having openings leading therefrom, of a series of curved trough-like paddles radially arranged in said chamber and cast integral with the outer end head for carrying water from the bottom of the chamber to said openings through which it passes out of the chamber during the rotation of the drum.

27. In apparatus for treating starch-material, in combination, a drum comprising a pair of end heads provided each with a set of radially arranged openings, a cylindrical member secured to said end-heads to form therewith a cylindrical shell, a second cylindrical shell supported concentrically within said first-mentioned shell whereby a space or jacket is formed between the shells, means for admitting a heating or cooling fluid into said jacket through one set of openings, means for permitting the escape of fluid through the other set of openings, and means located in the jacket for carrying water from the bottom of the jacket to said last-mentioned set of openings through which it passes out of the jacket during the rotation of the drum.

28. In apparatus for treating starch-material, in combination, a drum comprising a pair of end-heads provided each with a set of radially arranged openings, a cylindrical member secured to said end-heads to form therewith a cylindrical shell, a second cylindrical shell supported concentrically within said first-mentioned shell whereby a space or jacket is formed between the shells, means for admitting a heating or cooling fluid into said jacket through one set of openings, means for permitting the escape of fluid through the other set of openings, and a series of paddles carried by one of the end-heads for carrying water from the bottom of the jacket to said last-mentioned set of openings through which it passes out of the jacket during the rotation of the drum.

29. In apparatus for treating starch-material, in combination, a drum comprising a pair of end-heads provided each with a set of radially arranged openings, a cylindrical member secured to said end-heads to form therewith a cylindrical shell, a second cylindrical shell supported concentrically within said first-mentioned shell whereby a space or jacket is formed between the shells, means for admitting a heating or cooling fluid into said jacket through one set of openings, means for permitting the escape of fluid through the other set of openings, and a series of paddles cast integral with one of the end-heads for carrying water from the bottom of the jacket to said last-mentioned set of openings through which it passes out of the jacket during the rotation of the drum.

30. In apparatus for treating starch-material, in combination, a drum comprising a pair of end-heads provided each with a hub having openings therein, a cylindrical member secured to said end heads to form therewith a cylindrical shell, a second cylindrical shell supported concentrically within said first-mentioned shell whereby a space or jacket is formed between the shells, means for admitting a heating or cooling fluid into said jacket through the openings in one of said hubs, means for permitting the escape of the fluid through the openings in the other hub, and means located in the jacket for carrying water from the bottom of the jacket to said last-mentioned openings through which it passes out of the jacket during the rotation of the drum.

31. In apparatus for treating starch-material, in combination, a drum comprising a pair of end-heads provided each with a hub having openings therein, a cylindrical member secured to said end-heads to form therewith a cylindrical shell, a second cylindrical shell supported concentrically within said first-mentioned shell, means for admitting a heating or cooling fluid into said jacket through the openings in one of said hubs, means for permitting the escape of the fluid through the openings in the other hub, and a series of paddles carried by one of the end-heads for carrying water from the bottom of the jacket to said last-mentioned openings through which it passes out of the jacket during the rotation of the drum.

32. In apparatus for treating starch-material, in combination, a drum comprising a pair of end-heads provided each with a hub having openings therein, a cylindrical member secured to said end-heads to form therewith a cylindrical shell, a second cylindrical shell supported concentrically within said first-mentioned shell, means for admitting a heating or cooling fluid into said jacket through the openings in one of said hubs, means for permitting the escape of the fluid through the openings in the other hub, and a series of paddles cast integral with one of the end-heads for carrying water from the bottom of the jacket to said last-mentioned openings through which it passes out of the jacket during the rotation of the drum.

33. In apparatus for treating starch-material, in combination, a drum provided with a jacket, a central pipe extending longitudinally through said drum, pipes within the cooker connected at one end with the interior of said central pipe and closed at their free ends whereby steam may flow into said pipes, means connecting said jacket and said central pipe independently with a source of steam-supply, and means for governing the presure at which steam is admitted to said jacket and central pipe, whereby it may be passed through the jacket and the central pipe simultaneously at different pressures.

34. In apparatus for treating starch-material, in combination, a drum having pipes secured to the inner wall thereof and closed at their free end, said drum being provided with a jacket with which said pipes communicate whereby steam will pass from the jacket into said pipes to heat the same, a central pipe extending longitudinally through the drum, pipes within the drum, each of which is connected at one end with the interior of said central-pipe and closed at its free end, whereby steam passes into said pipes, means for connecting said jacket and said central pipe simultaneously with a source of steam-supply, means for governing the presure at which the steam is admitted to the jacket and central pipe, said means being arranged to pass steam through the jacket and the central pipe at different pressures.

35. In apparatus for treating starch-material, in combination, a drum provided with a jacket, a pair of pipes arranged one within the other and extending longitudinally through said drum, a main pipe arranged to be connected with a source of steam-supply, a branch-pipe connecting the outer of said pair of pipes with the main pipe, a second branch-pipe connecting the jacket with the main pipe, a steam-valve in said second branch-pipe, a by-pass around said steam-valve, a reducing-valve and a steam-valve in said by-pass, whereby, when said first-mentioned steam-valve is open and said second-mentioned steam-valve is closed, the steam passes directly through said second branch-pipe into the jacket, and, when said first-mentioned steam-valve is closed and said second-mentioned steam-valve is open, the steam passes into the jacket through the reducing-valve in said by-pass, and means for supplying steam through the inner of said pair of pipes to the interior of the drum.

36. In apparatus for treating starch-material, in combination, a drum provided with a jacket, a central pipe extending longitudinally through said drum, pipes within the cooker connected at one end with the interior of said central pipe and closed at their free ends whereby steam is admitted into said pipes, a main pipe arranged to be connected with a source of steam-supply, a branch-pipe connecting the central pipe with the main pipe, a second branch-pipe connecting the jacket with the main pipe, a steam-valve in said second branch-pipe, a by-pass around said steam-valve, a reducing-valve and a steam-valve in said by-pass, whereby, when said first-mentioned steam-valve is open and said second-mentioned steam-valve is closed, the steam passes directly through said second branch-pipe into the jacket, and, when said first-mentioned steam-valve is closed and said second-mentioned steam-valve is open, the steam passes into the jacket through the reducing-valve in said by-pass.

37. In apparatus for treating starch-material, in combination, a drum having pipes secured to the inner wall thereof and closed at their free end, said drum being provided with a jacket with which said pipes communicate whereby steam is admitted into said pipes, a main pipe arranged to be connected with a source of steam-supply, a branch-pipe connecting the central pipe with the main pipe, a second branch-pipe connecting the jacket with the main pipe, a steam-valve in said second branch-pipe, a by-pass around said steam-valve, a reducing-valve and a steam-valve in said by-pass, whereby, when said first-mentioned steam-valve is open and said second-mentioned steam-valve is closed, the steam passes directly through said second branch-pipe into the jacket, and, when said first-mentioned steam-valve is closed and said second-mentioned steam-valve is open, the steam passes into the jacket through the reducing-valve in said by-pass.

38. In apparatus for treating starch-material, in combination, a drum provided with a jacket, a central pipe extending longitudinally through said drum, a main pipe arranged to be connected with a source of steam-supply, a branch-pipe connecting the central-pipe with the main pipe, a second branch-pipe connecting the jacket with the main pipe, a steam-valve in said main pipe between said branch-pipes, a by-pass around said steam-valve, a steam-valve in the second branch-pipe, a by-pass around said last-mentioned steam-valve and provided with a reducing-valve, each of said by-passes having a steam-valve, whereby, when the two first-mentioned steam-valves are closed and the by-pass steam-valves open, the steam passes into the central pipe and the jacket through said reducing-valve, and, when the steam-valves in the first-mentioned by-pass and the second-mentioned branch-pipe are closed and the other two steam-valves open, the steam passes directly into the central pipe but passes into the jacket through the reducing-valve in the second-mentioned by-pass.

39. In apparatus for treating starch-material, in combination, a drum provided with a jacket, a central pipe extending longitudinally through said drum, pipes within the cooker connected at one end with the interior of said central pipe and closed at their free ends whereby steam is admitted into said pipes, a main pipe arranged to be connected with a source of steam-supply, a branch-pipe connecting the central-pipe with the main pipe, a second branch-pipe connecting the jacket with the main pipe, a steam-valve in said main pipe between said branch-pipes, a by-pass around said steam-valve, a steam-valve in the second branch-pipe, a by-pass around said last-mentioned steam-valve and provided with a reducing-valve, each of said by-passes having a steam-valve, whereby, when the two first-mentioned steam-valves are closed and the by-pass steam-valves open, the steam passes into the central pipe and the jacket through said reducing-valve, and, when the steam-valves in the first-mentioned by-pass and the second-mentioned branch-pipe are closed and the other two steam-valves open, the steam passes directly into the central pipe but passes into the jacket through the reducing-valve in the second-mentioned by-pass.

40. In apparatus for treating starch-material, in combination, a drum having pipes secured to the inner wall thereof and closed at their free ends, said drum being provided with a jacket with which said pipes communicate whereby steam will pass from the jacket into said pipes to heat the same, a central pipe extending longitudinally through the cooker, pipes within the cooker connected at one end with the interior of said central pipe and closed at their free ends whereby steam is admitted into said pipes, a main pipe arranged to be connected with a source of steam-supply, a branch-pipe connecting the central-pipe with the main pipe, a second branch-pipe connecting the jacket with the main pipe, a steam-valve in said main pipe between said branch-pipes, a by-pass around said steam-valve, a steam-valve in the second branch-pipe, a by-pass around said last-mentioned steam-valve and provided with a reducing valve, each of said by-passes having a steam-valve, whereby, when the two first-mentioned steam-valves are closed and the by-pass steam-valves open, the steam passes into the central pipe and the jacket through said reducing-valve, and, when the steam-valve in the first-mentioned by-pass and the second-mentioned branch-pipe are closed and the other two steam-valves open, the steam passes directly into the central pipe but passes into the jacket through the reducing-valve in the second-mentioned by-pass.

41. In an apparatus for treating starch material, the combination with a rotatable jacketed drum, a movable lid therefor having a passage therethrough, and means for supplying a heating or a cooling fluid to said passage and exhausting the same therefrom while the drum is in rotation.

42. In an apparatus for treating starch material, the combination with a rotatable jacketed drum, a pivoted lid therefor having a passage therein, an inlet and outlet connection communicating with said passage for supplying fluid to and exhausting it from the same during the rotation of the drum.

43. In an apparatus for treating starch material, a rotatable drum, a jacket therefor providing communicating chambers circumferentially of and at one end of the drum, fluid conducting means leading from the said end chamber, and a radially disposed fin rotatable with the drum for conducting water from the bottom of the end chamber to the fluid conducting means during the rotation of the drum.

44. In an apparatus for treating starch material, a rotatable drum, a jacket therefor providing communicating chambers circumferentially of and at one end of the drum, fluid outlet means leading from the said end chamber adjacent the axis of rotation of the drum, and a plurality of radially disposed trough-like fins located in the end chamber and rotatable with the drum and extending from adjacent the peripheral portion of the jacket to the fluid outlet means.

45. In an apparatus for treating starch material, a rotatable drum having stirring members which are flattened in a plane at right angles to the axis of rotation of the drum and provided at their ends with cutting edges.

46. In an apparatus for treating starch material, the combination of a rotatable drum having stirring members extending inwardly from the wall thereof, and a normally stationary shaft provided with breaker members flattened in a plane at right angles to the axis of rotation of the drum, said breaker members being out of alinement with respect to the stirring members and extending to adjacent the wall of the drum, and means for rotating the shaft independently of the drum to move the breaker members into and out of coöperative relation with the stirring members.

In witness whereof, I have hereunto subscribed my name in the presence of two witnesses.

ALEXANDER P. ANDERSON.

Witnesses:
J. JAY SMITH,
LOUISE RAND BASCOME.

---

Corrections in Letters Patent No. 1,035,842.

It is hereby certified that in Letters Patent No. 1,035,842, granted August 20, 1912, upon the application of Alexander P. Anderson, of Chicago, Illinois, for an improvement in "Apparatus for the Treatment of Starch Materials," errors appear in the printed specification requiring correction as follows: Page 1, line 93, for the word "cooker" read *drum;* page 4, line 39, for the word "pins" read *fins;* page 6, line 101, for the word "cooker" read *drum;* page 7, lines 65 and 77, for the word "cooker" read *drum;* same page, line 89, for the word "exhaust" read *exhausting;* and line 106, for the word "braker" read *breaker;* page 10, lines 23 and 43, for the word "presure" read *pressure;* page 11, lines 101 and 111, before the word "end" insert the word *said;* and that the said Letters Patent should be read with these corrections therein that the same may conform to the record of the case in the Patent Office.

Signed and sealed this 29th day of October, A. D., 1912.

[SEAL.]

C. C. BILLINGS,
*Acting Commissioner of Patents.* alinement with respect to the stirring members and extending to adjacent the wall of the drum, and means for rotating the shaft independently of the drum to move the breaker members into and out of coöperative relation with the stirring members.

In witness whereof, I have hereunto subscribed my name in the presence of two witnesses.

ALEXANDER P. ANDERSON.

Witnesses:
J. JAY SMITH,
LOUISE RAND BASCOME.

---

Corrections in Letters Patent No. 1,035,842.

It is hereby certified that in Letters Patent No. 1,035,842, granted August 20, 1912, upon the application of Alexander P. Anderson, of Chicago, Illinois, for an improvement in "Apparatus for the Treatment of Starch Materials," errors appear in the printed specification requiring correction as follows: Page 1, line 93, for the word "cooker" read *drum;* page 4, line 39, for the word "pins" read *fins;* page 6, line 101, for the word "cooker" read *drum;* page 7, lines 65 and 77, for the word "cooker" read *drum;* same page, line 89, for the word "exhaust" read *exhausting;* and line 106, for the word "braker" read *breaker;* page 10, lines 23 and 43, for the word "presure" read *pressure;* page 11, lines 101 and 111, before the word "end" insert the word *said;* and that the said Letters Patent should be read with these corrections therein that the same may conform to the record of the case in the Patent Office.

Signed and sealed this 29th day of October, A. D., 1912.

[SEAL.]

C. C. BILLINGS,
*Acting Commissioner of Patents.*

Corrections in Letters Patent No. 1,035,842.

It is hereby certified that in Letters Patent No. 1,035,842, granted August 20, 1912, upon the application of Alexander P. Anderson, of Chicago, Illinois, for an improvement in "Apparatus for the Treatment of Starch Materials," errors appear in the printed specification requiring correction as follows: Page 1, line 93, for the word "cooker" read *drum;* page 4, line 39, for the word "pins" read *fins;* page 6, line 101, for the word "cooker" read *drum;* page 7, lines 65 and 77, for the word "cooker" read *drum;* same page, line 89, for the word "exhaust" read *exhausting;* and line 106, for the word "braker" read *breaker;* page 10, lines 23 and 43, for the word "presure" read *pressure;* page 11, lines 101 and 111, before the word "end" insert the word *said;* and that the said Letters Patent should be read with these corrections therein that the same may conform to the record of the case in the Patent Office.

Signed and sealed this 29th day of October, A. D., 1912.

[SEAL.]

C. C. BILLINGS,
*Acting Commissioner of Patents.*